United States Patent
Sanderson et al.

[11] Patent Number: 5,365,726
[45] Date of Patent: Nov. 22, 1994

[54] COTTON PICKER BAR WITH LOWER RETENTION

[75] Inventors: Leon F. Sanderson, Urbandale; Kenneth C. McConnell; John L. Hintzsche, both of Ankeny; Donald K. Davenport, Woodburn, all of Iowa

[73] Assignee: Deere & Company, Moline, Ill.

[21] Appl. No.: 183,014

[22] Filed: Jan. 18, 1994

[51] Int. Cl.⁵ ............................................. A01D 46/18
[52] U.S. Cl. ............................................. 56/41; 56/44
[58] Field of Search ........................... 56/40, 41, 44, 48

[56] References Cited

U.S. PATENT DOCUMENTS

| | | |
|---|---|---|
| 510,730 | 12/1893 | Todd . |
| 972,795 | 10/1910 | Appleby . |
| 2,766,574 | 10/1956 | Hubbard ........................ 56/44 |
| 3,031,831 | 5/1962 | Jennings et al. ............... 56/44 |
| 3,035,389 | 5/1962 | Sadler et al. .................. 56/44 |
| 3,092,949 | 6/1963 | Sadler et al. .................. 56/44 |
| 4,463,543 | 8/1984 | Hubbard et al. ............... 56/44 |
| 4,723,399 | 2/1988 | Rail ............................... 56/44 |

Primary Examiner—George A. Suchfield

[57] ABSTRACT

The picker bar on a cotton harvester drum includes a lower bushing with a thrust surface added. The spindle drive shaft is drilled and tapped to receive a bolt inserted through the bottom of the picker bar. Bevel gear thrust loads are transferred through a thrust washer, secured by the bolt to the bottom of the drive shaft, to the lower bushing thereby eliminating need for a snap ring and snap ring groove at the top of the bar. The spur gear bending load at the top the bar is transferred through a large rigid gear section to the bearing at the top of the bar. The top bearing is supported closer to the gear load than in previous bars which utilize snap ring retention. The drive shaft, bevel gears, upper bearing and drive gear section are inserted as a single assembly into the upper end of the picker bar during manufacture.

20 Claims, 2 Drawing Sheets

COTTON PICKER BAR WITH LOWER RETENTION

BACKGROUND OF THE INVENTION

Field of the Invention

The present invention relates generally to cotton harvesters, and, more specifically, to a cotton picker bar assembly.

Related Art

Cotton picker bar assemblies such as shown in U.S. Pat. Nos. 4,723,399 and 4,463,543 include an upright aluminum picker bar journalled in the drum head of an upright cotton picking unit. The steel drive shaft in current picker bars is retained in position by a snap ring in the top of the picker bar bore. Both drive torque and thrust load are applied near the top of the shaft. The entire upward thrust load from the picker spindle bevel gears is taken against the snap ring, and during plugging conditions thrust loads become excessive. The snap ring can be forced out of its groove, and such a failure of a snap ring results in a major, time-consuming repair job. The upper retention reduces the ability to control spindle backlash since the lower bevel gears are most heavily loaded during normal picking operations, and the amount of backlash is dependent upon the location of the cam follower arm fixed to the top of the picker bar. As the bar heats up and expands, the backlash increases due to differences in expansion between the steel shaft and aluminum bar.

The need for the upper snap ring requires that the upper roller bearing supporting the picker bar drive shaft be located substantially below the top of the bar and offset a relatively large distance from the actual main gear loading. The separation forces between the drive and driven gears has a tendency to bend the bar away from the drive gear which causes the gears to jump teeth and results in chipped teeth. The snap ring also limits the ability to provide a simple and reliable grease seal at the top of the bar and requires a ring receiving groove in an area of maximum loading, thereby weakening the bar. The top thrust location limits lubrication retention and therefore the lubrication cycle is short. In addition, the snap ring and thrust washer require that the driven gear on the drive shaft be assembled separately from the components directly below the driven gear. Assembly of the bearings and snap rings in the zones is restricted by the cam followers above the zones and significantly increases manufacturing time. The snap ring groove also presents an area where components can get hung up as they are positioned within the bar during assembly.

A picker bar assembly typical of the prior art and including an upper snap ring is shown at 10 in FIG. 1 and described below. Reference may also be had to the above-mentioned patents for a better appreciation of the limitations of the prior assemblies.

BRIEF SUMMARY OF THE INVENTION

It is therefore an object of the present invention to provide an improved picker bar assembly which overcomes most or all of the above-mentioned problems. It is a further object to provide such an assembly which is easier to assemble and requires less components than at least most previously available picker bars. It is another object to provide such a picker bar assembly which is lower in cost but has a longer life than most previously available assemblies.

It is a further object of the present invention to provide an improved picker bar assembly wherein thrust loads in the drive shaft are taken closer to the most heavily loaded spindles. It is another object to provide such an assembly which is simple in construction and eliminates need for upper snap rings and difficult to assemble upper thrust bearing components. It is a further object to provide such an assembly which has increased strength and improved thrust bearing lubrication.

It is yet another object of the present invention to provide an improved picker bar assembly with an upper drive shaft bearing structure that is located closer to the center of the main drive gear. It is a further object to provide such an assembly which simplifies assembly of the bar and permits the spindle drive shaft gear to be made integral with the component directly below the gear for fewer parts and easier assembly.

It is still another object of the present invention to provide an improved picker bar having a longer lubrication cycle. It is another object to provide such a bar wherein backlash does not increase as the bar expands with increasing temperature.

The picker bar on a cotton harvester drum includes a lower bushing with a thrust surface added. The spindle drive shaft is drilled and tapped to receive a bolt through the bottom of the picker bar. A thrust washer, secured by the bolt to the bottom of the drive shaft after the shaft is inserted in the bar, rotates against the lower bushing thrust surface. Bevel gear thrust loads are transferred to the lower bushing thereby eliminating need for a snap ring and snap ring groove at the top of the bar, and thrust surface lubrication is improved. Thrust loads are taken closer to the more heavily loaded lower spindles, and backlash does not increase as the bar heats up. The spur gear bending load at the top the bar is transferred through a large rigid gear section to the bearing at the top of the bar. The top bearing is supported closer to the gear load than in previous bars which utilize snap ring retention to reduce the likelihood of gears jumping teeth. The drive shaft, bevel gears, upper bearing and drive gear section are inserted as a single assembly into the upper end of the picker bar for ease of manufacture. The elimination of upper snap ring grooves reduces areas where the drive shaft assembly can get caught up during assembly.

These and other objects, features and advantages of the present invention will become apparent to one skilled in the art upon reading the following detailed description in view of the drawings.

DETAILED DESCRIPTION OF THE DRAWINGS

Figure 1:
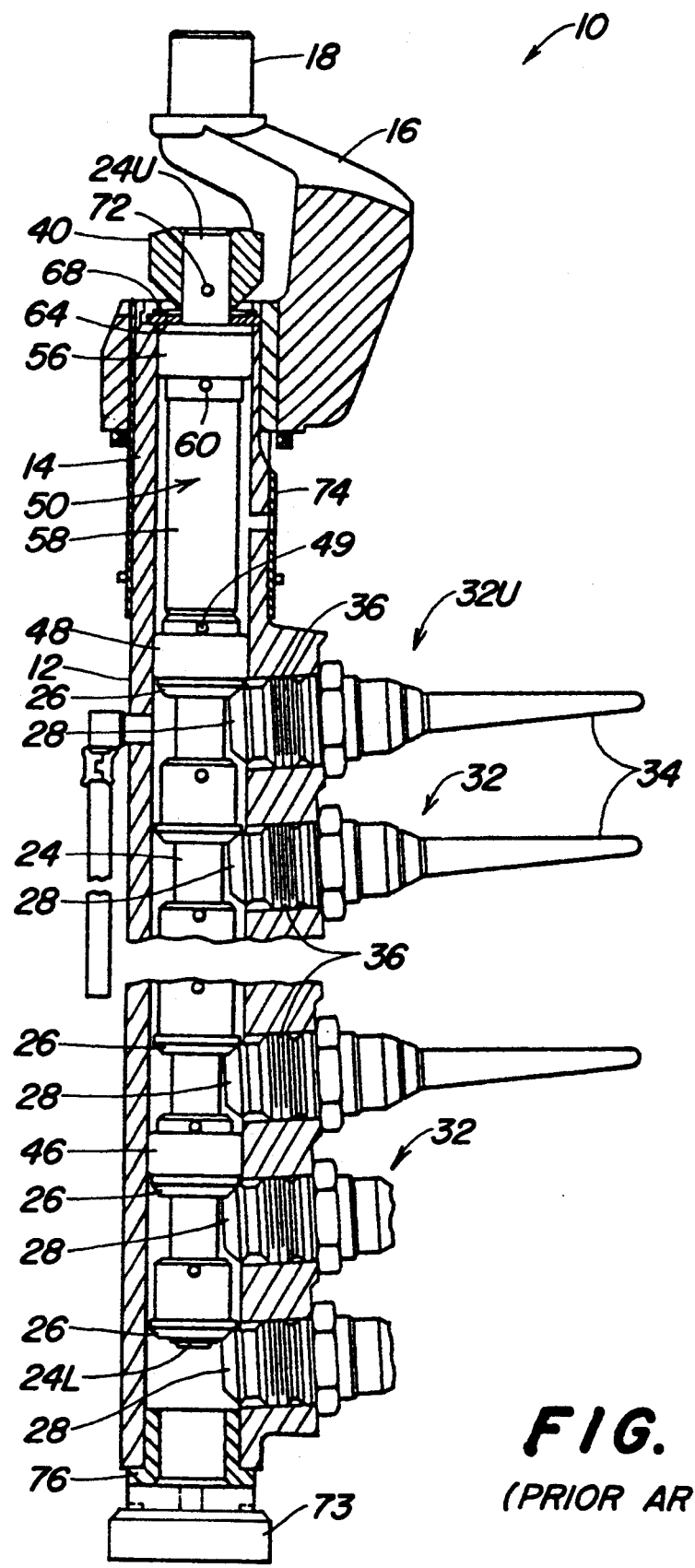
FIG. 1 is a view, partially in section, of a conventional picker bar assembly.

Referring to FIG. 1, therein is shown a picker bar assembly 10 typical of the prior art. The assembly 10 includes a hollow picker bar 12 with an upper end 14 adapted for journalling in the row unit drum head (not shown). A cast cam follower arm 16 is non-rotatably secured to the upper end 14, and a cam follower 18 seats in a cam track (not shown) fixed to the row unit housing. A spindle drive shaft 24 has bevel pinions 26 which mesh with pinions 28 on the inner ends of spindle assemblies 32. The assemblies 32 include spindles 34 rotatably mounted in the bar 12 by spindle nut and bearing assemblies 36 located below the corresponding pinions 26. A main spindle driven gear 40 is secured to the upper end 24U of the shaft 24 and is engaged by a conventional drive gear arrangement (a portion of which is shown at 75 in FIG. 2) to rotate the spindles 34 about their axes.

The lower end of the drive shaft 24 is supported for rotation about the shaft axis by a bearing 46 located above the pinion 26 for the second spindle assembly 32 from the bottom of the bar 12. The lowermost end 24L terminates at the bottom pinion 26. A bearing 48 secured to the drive shaft 24 by a roll pin 49 rotatably supports the shaft 24 at a location above the uppermost spindle assembly 32U. A multi-piece bearing assembly 50, also known as a shotgun shell because of the similarity in shape, is assembled over the shaft 24 above the bearing 48 and includes a roller thrust bearing 56 connected to a cylindrical spacer or sleeve 58 by a roll pin 60. A thrust washer 64 is secured against vertical movement relative to the upper end 14 by a lower ledge and an upper snap ring 68 which seats in a groove in the upper end 14. In some bars, a lip seal (not shown) is added above the snap ring 68 to seal against lubricant leakage. The main driven gear 40 is secured to the upper end 24U by a pin 72 after the assembly 50 is positioned within the bar 12. When the shaft 24 is under high thrust loads, the roll pin 49 and sleeve 58 help support the roll pin 60.

The lower end of the bar 12 is supported on the bottom of the picker drum (indicated generally at 73 in FIG. 1) by bearing structure or pivot stud 76 having a cylindrically shaped upper bearing surface received within the lower end of the bar 12 and terminating a substantial distance below the lowermost end 24 of the drive shaft 24. As the cam follower 18 is guided in the cam track, the bar 12 rotates on the stud 76 to properly orient the spindles 34. The upper end 14 of the picker bar 12 includes a wear sleeve 74 which is journalled in the picker drum head (see 75 of FIG. 2). Reference may be had to U.S. Pat. No. 4,723,399 for further details of the picker bar construction and for details of the picker bar lubrication.

Figures 2, 3:
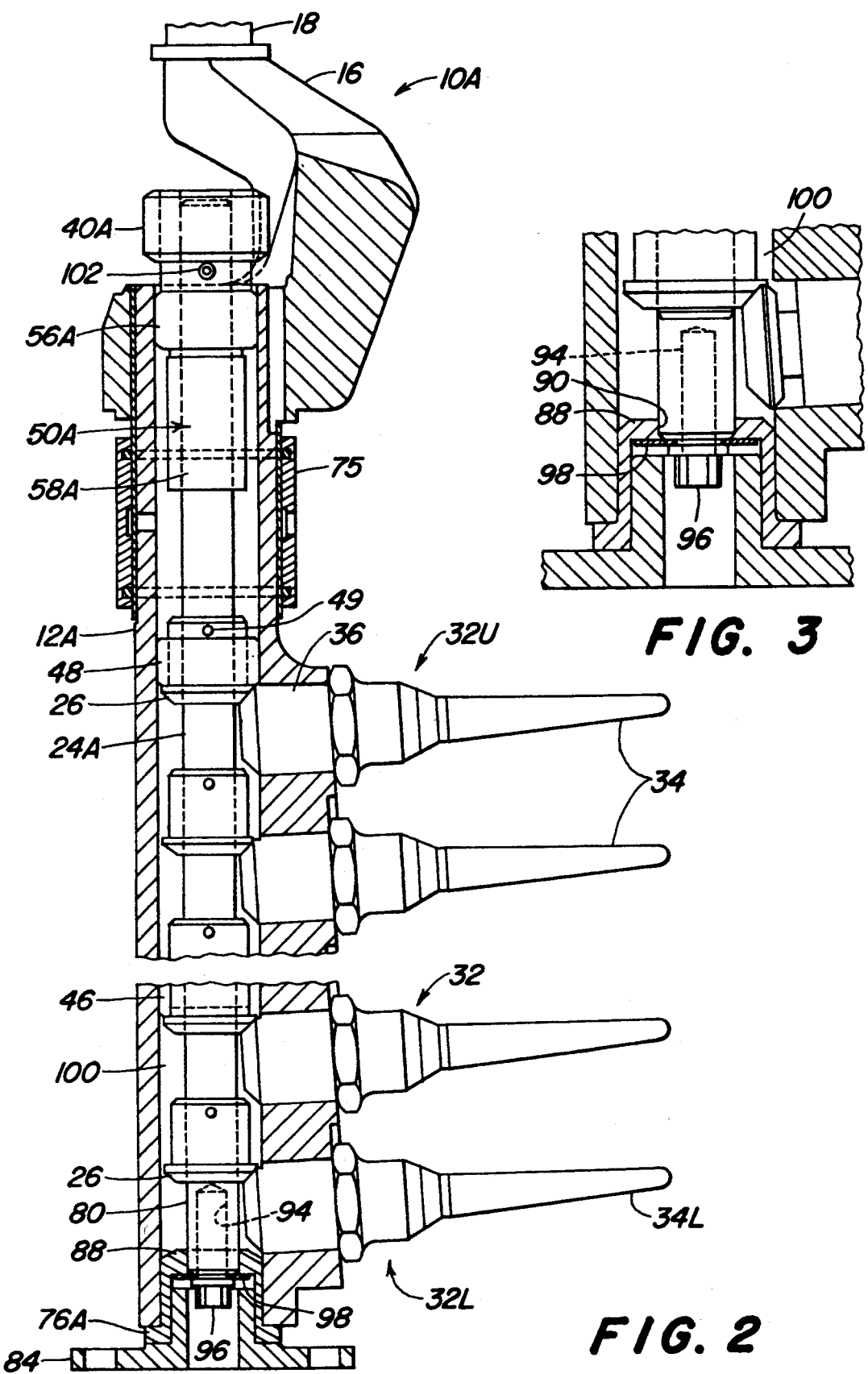
FIG. 2 is a view similar to FIG. 1 but showing the improved picker bar assembly of the present invention.
FIG. 3 is an enlarged view of a portion of the thrust bearing area of the bar assembly of FIG. 2.

Referring now to FIGS. 2 and 3, an improved picker bar assembly 10A is shown. With the exception of the upper and lower ends described in detail below, the structure and operation assembly 10A is generally identical to the assembly 10 of FIG. 1. The construction of FIGS. 2 and 3 without an upper thrust washer 64 eliminates need for the snap ring 68 of FIG. 1 and the corresponding snap ring groove in the interior surface of the uppermost end of the bar. As best seen in FIG. 2, a generally smooth, uninterrupted cylindrical surface is provided on the upper interior surface of the bar 12A for increased strength and ease of assembly.

The drive shaft 24A includes a lower end 80 which extends below the lowermost pinion 26 and terminates just below the lowermost spindle assembly 32L. A pivot stud 76A, which is supported by a bracket 84 bolted to the base of the picker drum, includes a hardened horizontal portion 88 with an aperture 90 which receives the shaft end 80. The end 80 of the shaft 24A is tapped and threaded at 94 to receive a bolt 96. A hardened washer 98 is secured against the bottom of the shaft end 80 by the bolt 96 and bears against the bottom of the horizontal portion 88 to define mating thrust surfaces which resist upward axial movement of the shaft 24A within the hollow interior of the bar 12A.

The aperture 90 in the pivot stud 76A also provides a radial bearing surface for the shaft end 80 below the pinion 26 of the heavily loaded lowermost spindle assembly 32 so that bending of the lower end of the shaft 24 off axis is reduced. Since the portion 88 is at the lowest area within the hollow interior of the bar 12A which defines an upright lubrication area indicated generally at 100, the bearing and thrust surfaces will be the last to be depleted of lubrication to thereby lessen the potential of premature thrust bearing damage due to lack of lubricant.

A simplified bearing assembly 50A (FIG. 2) is supported on the upper end of the shaft 24A and includes a sealed bearing 56A which is not required to withstand axial thrust. Therefore, no offset between the bearing 56A and the top of the bore of the bar 12A is required to accommodate snap rings or similar axial retention structure, and the bearing 56A is positioned close to the load point on the driven gear 40A (compare the vertical position of the bearing 56 of FIG. 1 with that of the bearing 56A of FIG. 2). The entire assembly 50A with the driven gear 40A attached is assembled as a single piece and then is attached to the drive shaft 24A using a roll pin 102. Thereafter, the shaft 24A with pinions and bearings is slid into the bore of the bar 12A. Once the shaft 24A is inserted into the bore, the bolt 96 with the thrust washer 98 is secured to the end 80, and the spindle assemblies 32 are threaded into the bar 12A. The above-described construction of the assembly 10A eliminates need for cumbersome assembly procedures adjacent the cam follower arm 16 and lends itself well to automated fabrication procedures. The washer 98 bearing against the lower horizontal surface of the horizontal surface 88 resists axially upward thrust caused by the separation force between meshing pinions 26 and 28 as the spindles 34 are driven. The spur gear bending load at the top the bar is transferred through the assembly 50A to the bearing 56A which is close to the gear load. As a result, there is little bending off axis of the upper end of the bar 24A. By transferring thrust loads to the bottom of the bar, stress in the upper roll pins is reduced and the sleeve 58A can be shortened substantially compared to the prior art structure of FIG. 1.

The bar 24A is fabricated from aluminum so that it has similar expansion characteristics as the bar 12A to reduce changes in gear backlash with changing temperatures. The lower drive shaft retention assures that any differential expansion of the drive shaft and picker bar caused by a higher drive shaft temperature will not result in increased backlash.

Having described the preferred embodiment, it will become apparent that various modifications can be made without departing from the scope of the invention as defined in the accompanying claims.

We claim:

1. In a cotton picker drum having an upright hollow spindle bar, the spindle bar supporting a plurality of vertically spaced spindle assemblies including a lowermost spindle assembly, the spindle assemblies having spindles and spindle gears for rotating the spindles, a drive shaft supported for rotation about a shaft axis within the bar and having upper and lower ends, a plurality of bevel gears connected for rotation with the shaft in mesh with the spindle gears, an upper drive gear connected to the upper end of the drive shaft, and a thrust bearing supporting the lower end of the drive shaft and providing substantially all the axial retention of the drive shaft within the spindle bar.

2. The invention as set forth in claim 1 wherein the lower end of the drive shaft extends below the bevel gear for the lowermost spindle assembly, and the thrust bearing comprises mating horizontal surfaces located below the bevel gear for the lowermost spindle assembly.

3. The invention as set forth in claim 1 wherein the thrust bearing includes a first thrust surface supported from the lower end of the drive shaft, and a mating thrust surface located within the lower end of the spindle bar.

4. The invention as set forth in claim 3 wherein the first thrust surface comprises a washer, and further including a threaded member securing the washer to the lower end of the drive shaft.

5. The invention as set forth in claim 1 including a bearing supported within the uppermost end of the spindle bar adjacent the upper drive gear, and wherein the uppermost end of the spindle bar adjacent the bearing includes a continuous cylindrical surface devoid of an axial thrust surface.

6. The invention as set forth in claim 1 wherein the spindle bar defines an upright lubrication area, and the thrust bearing is located at lowermost portion of the lubrication area.

7. In a cotton picker drum having an upright hollow spindle bar with uppermost and lowermost ends, the spindle bar supporting a plurality of vertically spaced spindle assemblies having spindles and spindle gears for rotating the spindles about spindle axes, a drive shaft supported within the bar and having upper and lower ends, a plurality of bevel gears connected for rotation with the drive shaft in mesh with the spindle gears, the meshing of the bevel and spindle gears providing drive shaft axial thrust in a first axial direction, an upper drive gear connected to the upper end of the drive shaft, an upper bearing rotatably supporting the upper end of the drive shaft in the uppermost end of the spindle bar adjacent the upper drive gear, and a thrust bearing located below the upper bearing and providing axial retention of the drive shaft in an axial direction opposite the first axial direction.

8. The invention as set forth in claim 7 wherein the spindle gears mesh with bevel gears located above the axes of rotation of the spindles so that the first axial direction is substantially vertically upward, and the thrust bearing comprises mating thrust surfaces located below the lowermost spindle assembly.

9. The invention as set forth in claim 7 wherein the lowermost end of the spindle bar includes an upright lubrication-receiving area, and wherein the thrust bearing is located near the bottom of the lubrication-receiving area so that the thrust bearing will receive lubricant until the lubrication-receiving area is substantially emptied of lubricant.

10. The invention as set forth in claim 7 further comprising a spindle bar pivot including a horizontal surface, the spindle bar pivot supporting the lowermost end of the spindle bar for rotation about an upright axis, and a cam arm connected to the uppermost end of the spindle bar for orienting the bar about the upright axis, and wherein the horizontal surface defines a thrust surface of the thrust bearing.

11. The invention as set forth in claim 10 wherein the thrust bearing further comprises a second thrust surface, and the second thrust surface is releasibly secured to the lower end of the drive shaft for facilitating insertion and removal of the shaft relative to the bar.

12. The invention as set forth in claim 11 wherein the picker bar defines an lubrication receiving area, and wherein the thrust bearing is located in the lowermost portion of the lubrication receiving area.

13. The invention as set forth in claim 7 wherein the uppermost end of the spindle bar includes a hollow, generally smooth constant radius internal surface substantially devoid of annular grooves.

14. The invention as set forth in claim 13 wherein the drive shaft, bevel gears and upper bearing comprise a single assembly unit, wherein the assembly unit is slidable into the hollow interior of the picker bar and the thrust bearing is secured to the lower end of the bar after the assembly unit is slid into the hollow interior.

15. The invention as set forth in claim 14 wherein the assembly unit is inserted into the uppermost end of the picker bar.

16. The invention as set forth in claim 7 wherein the picker bar and the drive shaft are fabricated from aluminum and have similar expansion characteristics.

17. The invention as set forth in claim 7 further comprising a rotary bearing surface located below the lowermost spindle assembly for limiting bending of the lower end of the drive shaft off axis.

18. The invention as set forth in claim 17 including a spindle bar pivot supporting the lower end of the spindle bar, the spindle bar pivot including a horizontal portion, wherein the radial bearing surface includes the cylindrical surface of an aperture which extends through the horizontal surface.

19. In a cotton picker drum having an upright hollow spindle bar, the spindle bar supporting a plurality of vertically spaced spindle assemblies including a lowermost spindle assembly, the spindle assemblies having spindles and spindle gears for rotating the spindles, a drive shaft supported for rotation about a shaft axis within the bar and having upper and lower ends, a plurality of bevel gears connected for rotation with the shaft in mesh with the spindle gears and providing drive shaft thrust loads in the vertical direction, an upper gear connected to the upper end of the drive shaft, and means supporting the lower end of the drive shaft for transferring the shaft loads in the vertical direction to the lower end of the spindle bar.

20. The invention as set forth in claim 19 wherein the means supporting the lower end of the drive shaft comprises a bushing with a horizontal surface supported within a lowermost portion of the spindle bar and including an aperture through the horizontal surface which receives the lower end of the drive shaft, and a thrust surface releasably secured to the lower end of the drive shaft and bearing against the horizontal surface.

* * * * *